W. C. SPROUL.
MILLING MACHINE.
APPLICATION FILED FEB. 16, 1920.
1,418,490.
Patented June 6, 1922.
3 SHEETS—SHEET 1.
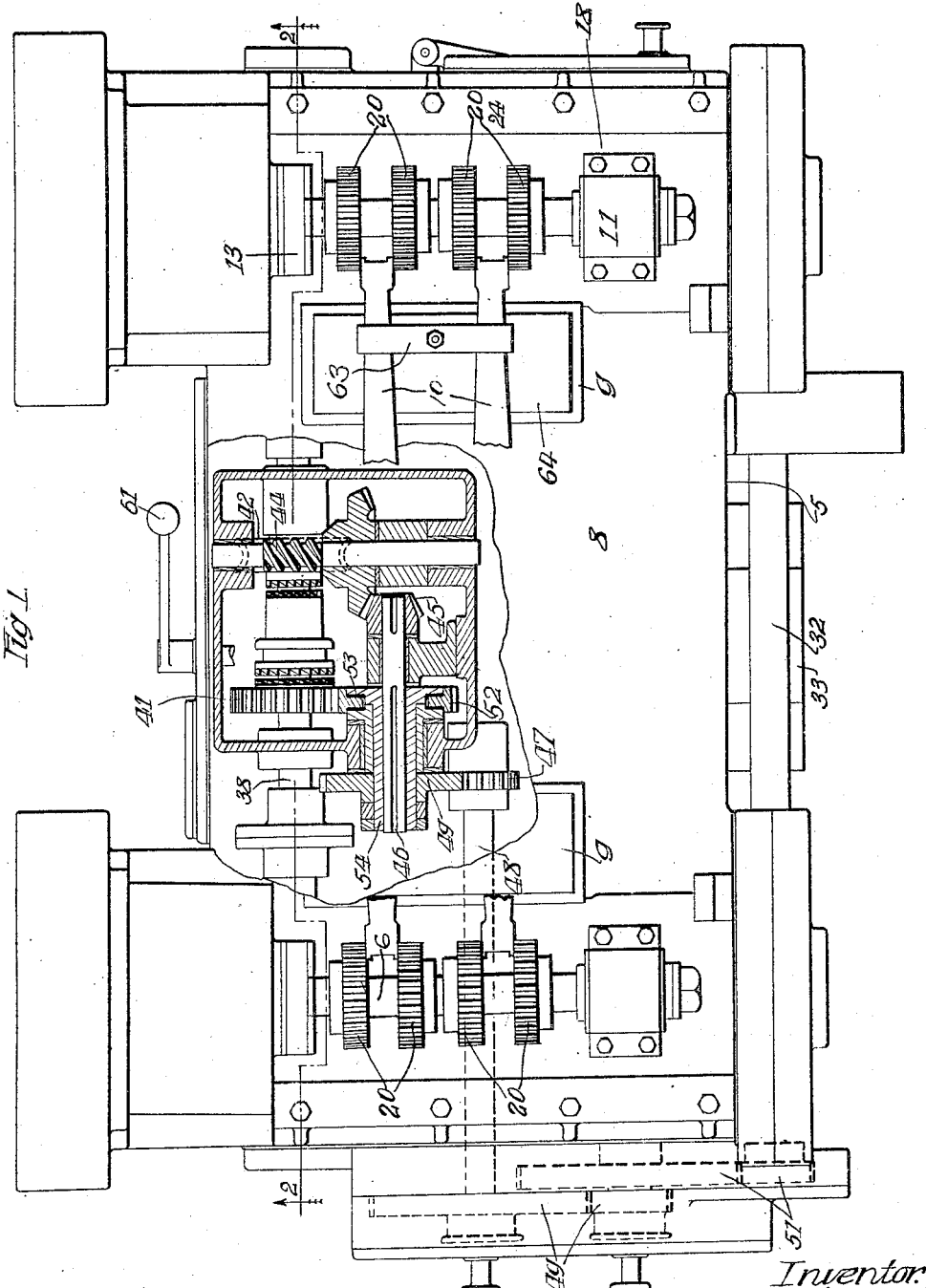

W. C. SPROUL.
MILLING MACHINE.
APPLICATION FILED FEB. 16, 1920.
1,418,490.
Patented June 6, 1922.
3 SHEETS—SHEET 2.
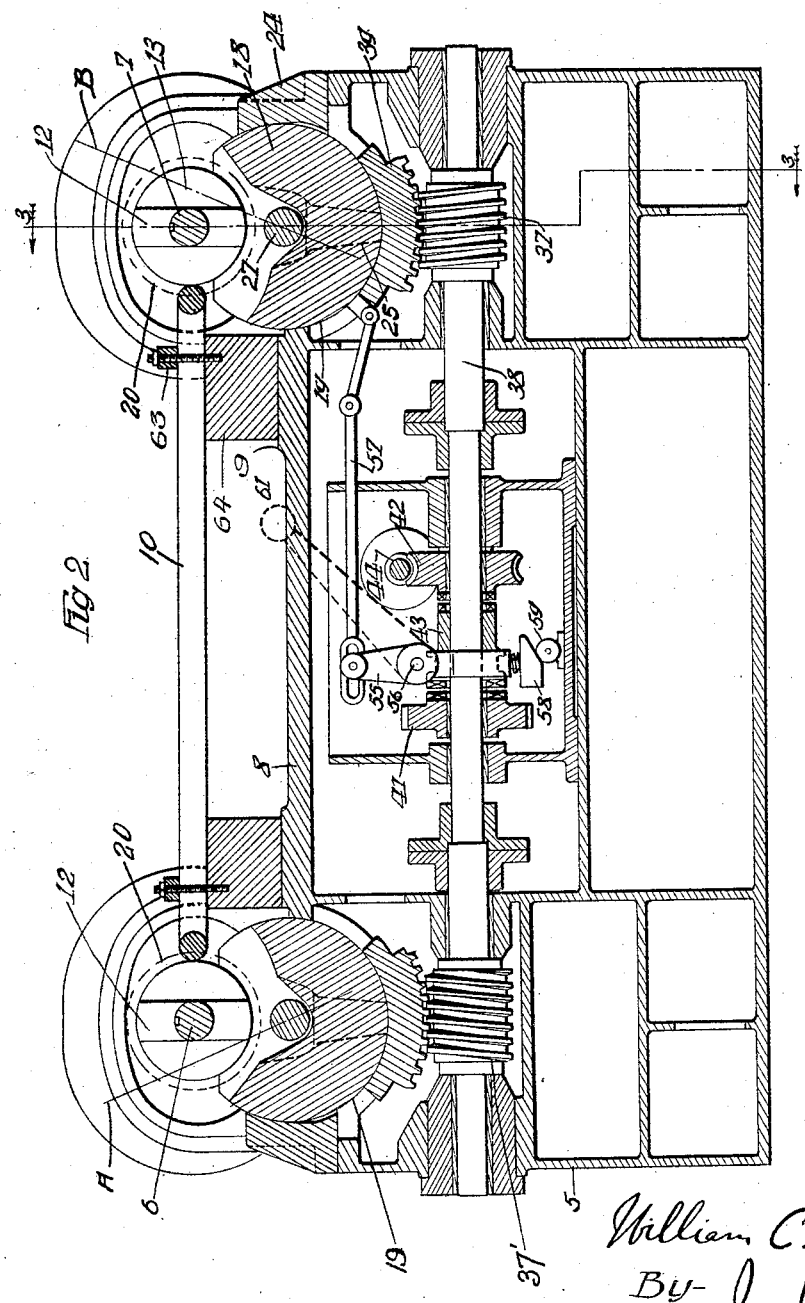

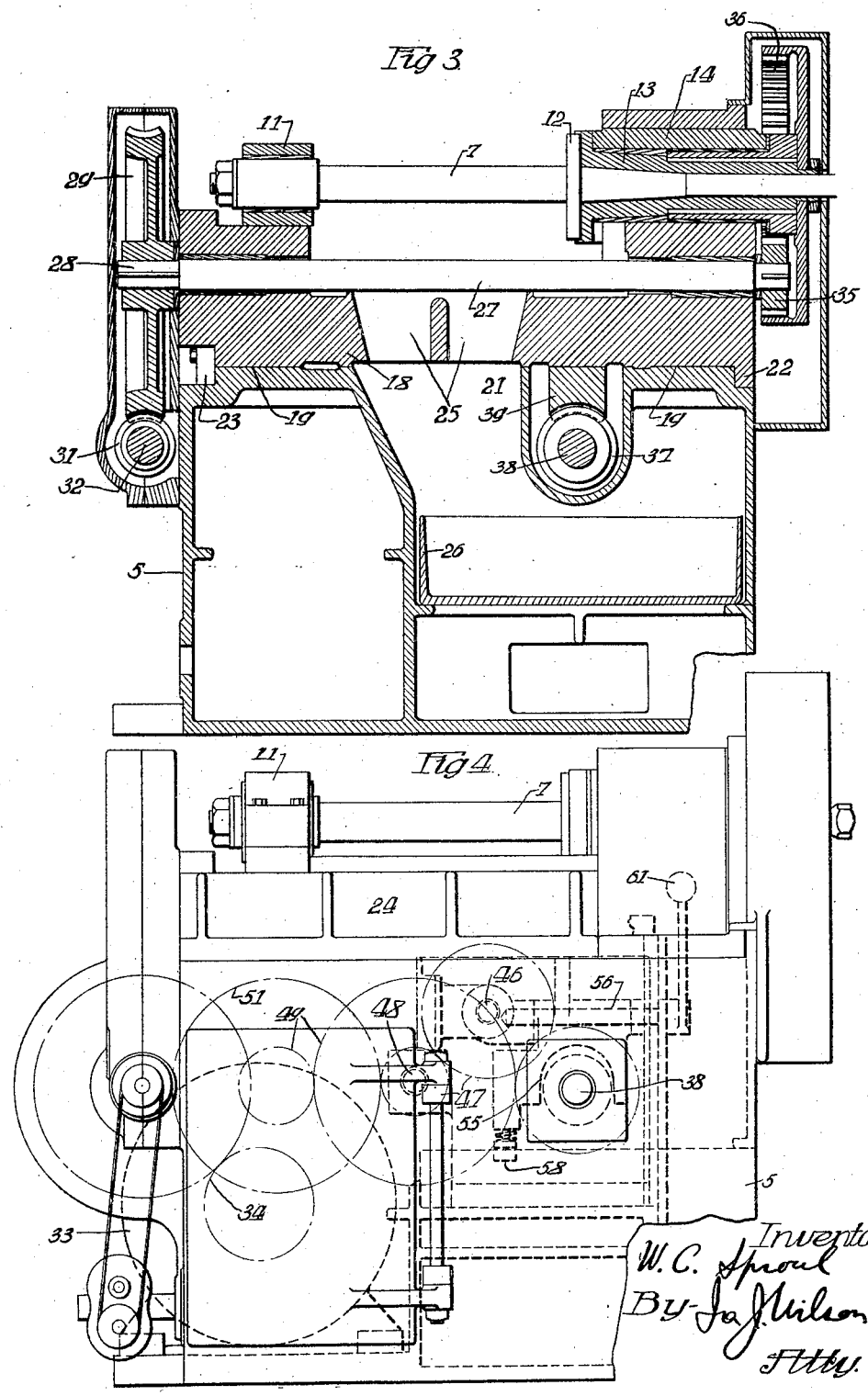

UNITED STATES PATENT OFFICE.

WILLIAM C. SPROUL, OF ROCKFORD, ILLINOIS.

MILLING MACHINE.

1,418,490. Specification of Letters Patent. Patented June 6, 1922.

Application filed February 16, 1920. Serial No. 359,061.

*To all whom it may concern:*

Be it known that I, WILLIAM C. SPROUL, a citizen of the United States, residing at Rockford, in the county of Winnebago and State of Illinois, have invented certain new and useful Improvements in Milling Machines, of which the following is a specification.

This invention pertains in general to metal-working machines, and has more particular reference to milling machines of a special type, that is, adapted for a particular work which can not be performed with the ordinary milling machines now in common use.

The primary object of the present invention is to provide a milling machine of such novel construction as to be peculiarly adapted for performing certain milling operations most effectually and economically with a view to enabling production of the milled parts with extreme accuracy and at a minimum cost. In other words, I have aimed to provide a milling machine suited to the requirements of manufacturers, especially automobile builders, for accurately and expeditiously milling certain parts, which with ordinary equipment require considerable time and trouble to machine. It should be understood, however, that my improvements are in no way limited to use in the automobile industry.

Another important object of my invention is the provision, generally stated, of a milling machine which shall include a pair of laterally spaced cutter arbors, means for supporting work intermediate the arbors, and mechanism for revolving the arbors and simultaneously moving them inwardly toward the work in a feed movement so that the cutters of both arbors will perform milling operations at the same time on either one or more pieces of interposed work.

A further object of my invention is the provision in a milling machine, of a cutter arbor carried by an eccentric to a drum having peripheral bearing support upon which the drum is oscillated to carry the arbor into and out of operative relation to the work. In this regard, I have further contemplated the arrangement of a pair of drums of this type in laterally spaced relation, and the provision of suitable mechanism for oscillating the drums while the arbors are revolved, for moving the arbors toward each other in a feed movement to mill the interposed work. A machine of this character is of special utility where it is desired to mill one or more surfaces at opposite end portions of relatively large parts, and as exemplified in the drawings of the present application, is designed primarily to mill in a single operation the top and bottom surfaces of both ends of an automobile front axle, and more particularly, a plurality of such axles.

Still another object resides in the provision of suitable mechanism for oscillating the drums in timed relation to obtain a proper feed movement, a quick return movement at completion of the feed, and to automatically stop the drums in a neutral position to allow for change of work.

My invention further contemplates as an object, the carrying of a milling cutter in a novel manner, that is, by a carrier having a peripheral bearing of substantial diameter, and the provision of suitable mechanism for oscillating such carrier to obtain feed and return movements. A milling unit of this character may be very advantageously employed for special milling operations, which with ordinary equipment could not be as expeditiously nor as economically performed.

Other objects and attendant advantages will be appreciated by those familiar with this art as the invention becomes better understood by reference to the following description when considered in connection with the accompanying drawing, in which—

Figure 1 is a plan view, partially in section, of a milling machine embodying my improvements;

Fig. 2, a vertical sectional view taken substantially on the line 2—2 of Fig. 1;

Fig. 3, a sectional view taken substantially on the line 3—3 of Fig. 2; and

Fig. 4, an end elevation looking at the right hand end of the machine, as shown in Fig. 1.

As mentioned above, the present machine illustrating the principles of my invention, has been designed primarily for milling the yokes of automobile front axles. It is, therefore, essentially what might be termed a single-purpose machine, although with the use of other fixtures and cutters numerous other jobs might be advantageously done. It should be understood, therefore, that my invention contemplates the use of the principles disclosed herein for any milling or analogous operation to which they might be suited, irrespective of the number of cutters employed or the number of parts operated on at one time. It is well known that such tools and work fixtures are designed in each instance to suit the conditions and requirements of the particular work at hand.

Referring now to the drawings, a suitable base or frame is provided for carrying the various cooperating instrumentalities. Because of the nature and dimensions of the parts to be milled in the case at hand, particular attention is directed to the design and arrangement of parts to insure strength, rigidity and durability, so that the heavy milling operation may be carried on on a practical production basis. The base designated generally by character 5 is of special heavy and durable construction, and in its present embodiment, it is of rectangular shape. Upon the top portion of the base near the ends thereof, are mounted, preferably in parallel relation, the cutter arbors 6 and 7, together with their appurtenant feeding and driving parts. Intermediate these arbors the base is constructed to provide a table 8 upon which the work to be milled is mounted. As shown in Fig. 1, the table 8 is provided with a fixture stand 9 in proximity to each arbor. The parts to be milled, axles 10 in the present instance, are arranged lengthwise intermediate the arbors and rigidly secured adjacent to each end upon the fixture stands or pads 9 by any suitable means. In the present instance, the axles 10 are clamped at each end by means of a bar 63 and a clamping nut to a block 64 which is mounted on the pad 9. To facilitate an understanding of the invention, it will be noted at this point that the arbors are equipped with a plurality of milling cutters 20, spaced in proper relation, and mechanism to be presently described is provided for revolving these arbors and feeding the same inwardly toward the work to simultaneously mill a multiple of yoke surfaces in a single operation.

Inasmuch as the construction and operation of the cutter arbors and their operating parts at each end of the machine are identical, I will describe in detail simply that of the arbor 7. The arbor as plainly shown in Fig. 3, is rotatably mounted at one end in a bearing 11 and detachably secured at its opposite end to a spindle designated generally by character 13 revolubly mounted in the bearing 14. The connection between the arbor and spindle might be effected by any suitable means, and at present the diametrically disposed head 12 of the arbor is held in a complementary socket in the spindle by a retaining bolt (not shown). The arbor bearings 11 and 14 are carried by a feed drum designated generally by character 18, with the arbor positioned above and consequently eccentric to the longitudinal axis of the drum. The drum, extending from side to side of the base and being of substantial diameter, seats or rests in a semi-circular bearing socket or saddle 19 formed by the base, the bearing being interrupted medially of the drum as shown in Fig. 3, to provide a passage 21 for chips falling from the work. The drum, capable of oscillation on its peripheral bearing, is held against lengthwise displacement in one direction by the flange 22 engaging the base, as shown in Fig. 3, and in the opposite direction by a detachable flange 23, also co-operating with the base. A detachable drum clamp 24 extending substantially from end to end of the drum and bolted to the base, fittingly engages the periphery of the drum above the horizontal diameter thereof and serves as a retainer for holding the drum properly seated on its peripheral bearing. It will be obvious that the drum clamp constitutes part of the peripheral bearing and by being detachable, permits upward removal of the drum. As shown in Fig. 3, the drum is provided medially with a radial opening 25 communicating with the opening 21 so as to allow free passage of the chips to a receptacle 26 suitably supported in the base and removable from one side thereof. From the foregoing, it will be manifest that by oscillating the drum its cutter arbor will be swung in an arcuate path toward and from the work-supporting means so as to carry the cutters through feed and return movements. The means for so oscillating the drum will be presently described.

Mechanism is now provided for continuously revolving the arbor during such feed and return movements. This comprises a spindle driving shaft 27 mounted in bearings in the feed drum concentric therewith and projecting beyond both ends thereof. This shaft may be driven by any suitable means and in the present instance its extended end 28 is equipped with a worm gear 29 driven by a worm 31 on a shaft 32 which is driven from a motor 33 through the agency of gearing 34 (Figs. 3 and 4). The opposite end of the spindle driving shaft 27 is equipped with a pinion 35 meshing with an internal gear 36 which is suitably secured to the spindle 13. The spindle 7 will thus be continuously driven in a counter-clockwise direction viewing Fig. 2 by the motor 33 through the agency of the drive shaft 27 concentric with the feed drum 18, and it will be manifest that by reason of the peculiar arrangement of the arbor, its drive shaft 27 and the internal gear driving connection between the two, the arbor may be swung about the axis of the drive shaft 27 during the feed and return movements without interfering with the cutter driving connection. It will be understood that the shaft 32 also drives the arbor 6 through the agency of separate gearing identical with that employed for driving the arbor 7, except the worm drive which is opposite from the worm 31 and causes the arbor 6 to be revolved in a clockwise direction, viewing Fig. 2.

The immediate mechanism for oscillating the feed drum 18 consists of a worm 37 fixed to a feed shaft 38 and meshing with a segmental worm gear 39 fixed to the underside of the drum 18. By revolving the shaft 38, the drum 18 will be oscillated either in a clockwise direction, viewing Fig. 2, in a feed movement, or in the reverse direction to return the cutter, according to the direction of rotation of said shaft. This shaft 38 extends entirely through the machine from end to end thereof and is equipped with a second worm 37' meshing with a segmental worm gear on the drum which carries the cutter arbor 6. The threads on both these worms 37 lead in opposite directions so that when the drums are oscillated both cutter arbors will be simultaneously fed inwardly or outwardly, as the case may be.

Suitable mechanism is now provided for driving the shaft 38 to effect the arbor feed movement, and at a predetermined point in such movement the drive is reversed to effect quick return of the arbors to a starting position, at which they remain until the milled parts are removed and replaced by new ones, whereupon the machine will again be put in operation by the attendant. It should be understood that any suitable driving mechanism might be employed for this purpose, also that the invention is in no way limited to operating the feed drums in the particular order or cycle just mentioned, since such feed and return movements should correspond and be suited to the particular nature of the work. As illustrative of a working embodiment of driving mechanism for the present case, I propose to drive the shaft 38 from either of two gears 41 and 42 loosely revoluble upon said shaft and driven continuously in opposite directions. A clutch element 43 splined on the shaft 38 is adapted to be shifted in either direction to connect either the gear 41 or 42 to the shaft 38 to effect either the feed or quick reverse motion. In this instance, the worm gear 42 effects the feed movement and the spur gear 41, the reverse or quick return. The worm gear 42 is driven by a worm 44 in turn driven by the bevel gears 45 from the shaft 46. Fig. 1. This shaft is driven from the drive shaft 32 through the intermediary of gears 47, shaft 48, change speed gears 49, and gears 51. The gear 41 on the shaft 38 meshes with a gear 52 in driving connection with the shaft 46. In the present instance, a slip connection 53 is provided between the shaft 46 and a hub 54 to which the gears 47 and 52 are attached, so that in the event of excessive strain or resistance to the feed or reverse movement, the driving connection will be broken at this point without injury to the mechanism.

Any suitable mechanism may be provided for shifting the clutch element 43 to control oscillation of the feed drums, and may comprise a shifter yoke 55 pivotally mounted at 56, straddling the clutch element 43 at one end and having an upstanding arm with which is slidably connected a link 57, in turn connected to one of the feed drums, as plainly shown in Fig. 2. This yoke carries at its lower end a yieldable cam shoe 58 constantly urged against a roller 59. The yoke 55 is adapted to be manually shifted by means of a hand lever 61 fixed to the yoke shaft 56. Viewing Fig. 2, it will be manifest that upon swinging the lever 61 to the left, the gear 42 will be connected to the shaft 38, thus establishing the feed drive and causing both drums to be oscillated in a direction to feed their respective cutter arbors inwardly, performing the desired milling operation. When the feed is thus engaged the shoe 58 will be pressed upwardly, that is, carried on the top of the roller 59, thereby serving to hold the feed clutch engaged. At a predetermined point in the feed movement, the link connection 57 will be actuated by reason of its connection with the drum 18 to throw out the feed clutch and instantly engage the quick reverse clutch. To insure instantaneous reverse, a rapid clutch shifting action is obtained by means of the cam shoe 58, the inclined surface of which will be urged by the spring against the roller 59, causing a thrust in a direction to engage the reverse clutch. At the end of the reverse movement the reverse clutch will be disengaged by the action of the link connection 57 on the shifter 55, thus placing the machine in the neutral position.

It will be noted that the cutter arbors as shown in Figs. 1 and 2, have been fed inwardly by oscillation of their respective feed drums from the neutral or starting position indicated by the center lines A and B, and the clutch element 43 has been disengaged, leaving the arbor axes in the vertical planes of the drum axes.

It is believed that the operation will be readily understood from the foregoing, and special attention is directed to the fact that comparatively long cutter arbors are provided, each capable of carrying a gang of cutters adapted to mill a multiple of surfaces in a single operation, and that by reason of the peculiar and novel arrangement a very simple and practical arbor drive and feed mechanism is obtained. It will also be evident that the machine is designed along such lines as will insure absolute rigidity and stability of the work and cutter arbors, so that the resultant production will be to a fine degree of accuracy and uniformity.

The words "spindle" and "arbor" when used alone in a claim are synonymous, that is, designate a rotary means for carrying a cutter or tool.

It is believed that the foregoing conveys a clear understanding of the objects and principles of my invention, and while I have illustrated and described but a single working embodiment thereof, it should be understood that various changes might be made in construction and arrangement without departing from the spirit and scope of the invention as expressed in the appended claims, in which—

I claim:

1. A milling machine comprising a pair of laterally spaced oscillatory cutter spindle drums, a cutter spindle on each drum eccentric to the axis thereof, means for supporting work in a stationary position between said drums, means for revolving the cutter spindles, and means for oscillating the drums to feed the revolving cutters toward and from each other in feed and return movements, whereby to mill the interposed work.

2. In a milling machine, the combination of an oscillatory drum, a stationary saddle in which the drum oscillates, a cutter spindle revolubly mounted on the drum eccentric to the axis thereof, means for supporting a work-piece in a stationary position in juxtaposition to the drum, means for revolving the cutter spindle, and means for oscillating the drum to move the revolving cutter in a feed and return movement with respect to the work.

3. A milling machine comprising a pair of laterally spaced drums, each rotatable about its longitudinal axis, an arbor mounted on each drum to revolve about an axis eccentric to that of the drum, means for supporting work intermediate the drums, mechanism for oscillating the drums to feed the arbors inwardly toward the interposed work, and mechanism for revolving the arbors during such feed movement.

4. In a milling machine, the combination of a base, a drum revoluble about its longitudinal axis on the base, a milling cutter arbor mounted on the drum to revolve about an axis eccentric thereto, means for supporting work on the base in proximity to the arbor, mechanism for oscillating the drum to move the arbor toward the work in a feed movement and to retract the arbor, and mechanism for revolving the arbor during such feed movement.

5. In a milling machine, a drum mounted to oscillate about its longitudinal axis, a milling cutter arbor mounted on the drum to revolve about an axis eccentric thereto, means for supporting work in juxtaposition to the arbor, a segmental gear on the drum, a worm meshing with said gear, means for revolving the worm to feed the arbor toward the work, and means for revolving the arbor during such feed movement.

6. In a metal working machine, a drum mounted to oscillate about its longitudinal axis, a cutter arbor mounted on the drum to revolve about an axis eccentric thereto, means for supporting work in juxtaposition to the arbor, an internal gear concentric with the arbor for driving the same, an arbor driving shaft concentric with the drum and equipped with a pinion meshing with said internal gear, means for driving said shaft, and means for moving the drum about its axis for carrying the arbor in a feed movement toward the work.

7. In a milling machine, the combination of a pair of laterally spaced drums stationary saddles in which the drums are adapted to be oscillated, a cutter spindle mounted on each drum eccentric to the axis thereof, means for supporting work in a stationary position intermediate the drums, mechanism for simultaneously oscillating the drums to move the cutter spindles toward each other in a feed movement, and mechanisms for revolving the spindles during such feed movement.

8. In a milling machine, a pair of laterally spaced cutter arbors, means so supporting each arbor that it is movable about an axis eccentric to its axis of rotation, means for supporting work intermediate the arbors so as to be milled by the cutters of both, an internal gear concentric with each arbor for driving the same, a driving shaft for each arbor concentric with the first mentioned axis, a pinion on each driving shaft meshing with the internal gear of its respective arbor, and means for moving the arbors toward and from each other about said first mentioned axes.

9. In a metal working machine, the combination of a pair of laterally spaced arbors, means supporting the arbors so that each is capable of oscillation about an axis eccentric to its axis of rotation, means for supporting work intermediate the arbors so as to be operated on by the tools thereof when the arbors are moved inwardly toward the work, means for revolving the arbors, a segmental gear associated with each arbor-carrying means, a worm meshing with each segmental gear, and driving mechanism interposed between and connected with said worms for revolving them in opposite directions to impart feed movement to the arbors inwardly toward each other.

10. In a metal working machine, the combination of a pair of laterally spaced driving shafts, a pinion fixed to each shaft, an internal gear meshing with each pinion, a cutter arbor mounted concentric with each internal gear and in driving connection therewith, means supporting each arbor for oscillation about the axis of its respective driving shaft, means for supporting work intermediate the arbors so as to be operated upon by the tools of both, and means for imparting feed movement to the arbors about the axis of said driving shafts for moving the arbors toward each other in a feed movement.

11. In a metal working machine, the combination of a pair of laterally spaced arbors, means supporting the arbors so that each is capable of oscillation about an axis eccentric to its axis of rotation, means for supporting work intermediate the arbors so as to be operated on by the tools thereof when the arbors are moved inwardly toward the work, means for revolving the arbors, a segmental gear associated with each arbor-carrying means, a worm meshing with each segmental gear, a driving shaft connecting said worms, and mechanism on said shaft including elements driven in opposite directions and adapted to be respectively connected to the shaft for revolving the worms in opposite directions and consequently imparting feed and return movement to the arbor.

12. In a milling machine, a relatively long drum of substantial diameter and having peripheral bearing support at both ends, means for oscillating said drum about its longitudinal axis, a milling cutter arbor mounted at each end in bearings on and adjacent to the ends of the drum and eccentric to the axis of rotation thereof, means for supporting work in juxtaposition to the arbor, and means for revolving the arbor during feed movement thereof toward the work.

13. In a milling machine, a relatively long drum of substantial diameter and having peripheral bearing support at both ends, means for oscillating said drum about its longitudinal axis, a milling cutter arbor mounted at each end in bearings on and adjacent to the ends of the drum and eccentric to the axis of rotation thereof, means for supporting work in juxtaposition to the arbor, and means for revolving the arbor during feed movement thereof toward the work, the arbor being positioned above the drum, and said drum having a radial opening therethrough beneath the arbor for the passage of chips.

14. In a milling machine of the character described, the combination of a bed, a pair of laterally spaced drum saddles stationary on the bed, a spindle-carrying drum mounted for oscillation in each saddle, a cutter spindle revolubly mounted on each drum eccentric to the axis thereof, means for supporting work in a stationary position on the bed intermediate said saddles, and mechanism for simultaneously revolving the cutter spindles and oscillating the drums to mill the interposed work.

15. In a milling machine, a pair of laterally spaced drums having peripheral bearing support and adapted to be oscillated upon such bearings, a cutter arbor mounted on each drum to revolve about an axis eccentric thereto, means for supporting work intermediate the arbors, means for oscillating the drums on said bearings to move the arbors toward each other in a feed movement and away in a return movement, and means for revolving the arbors during such feed and return movements.

16. A metal working machine comprising a base, the medial top portion of which constitutes a work supporting table a pair of feed drums mounted on the base opposite each end of the work table to move rotatably thereon, a cutter arbor revolubly mounted on each drum eccentric thereto, means for revolving said arbors, and means for oscillating the drums to feed the arbors toward the interposed work.

17. An axle milling machine of the character described comprising a bed, the medial portion of which is adapted to support one or more axles, a spindle carrier mounted at each end of the bed and adapted to be oscillated on an axis eccentric with respect to the spindle axis for moving the spindle toward and from the interposed work, a cutter arbor concentric with and fixed to each spindle and adapted for carrying cutters for milling the end of the adjacent axle, means for revolving the spindles, and means for oscillating said spindle carriers to move the revolving cutter arbors toward and from the interposed work in feed and return movements.

18. In a milling machine, a base having on its top a pair of laterally spaced substantially semicircular drum bearings and a work-supporting table intermediate said bearings, a drum seated on each bearing and adapted to be oscillated, a cutter arbor mounted on each drum, and mechanism for revolving the arbors and oscillating the drums to feed the arbors toward the work table.

19. In a metal working machine, a drum mounted to oscillate about its longitudinal axis, a spindle revolubly mounted upon one end of the drum in parallel but spaced relation therefrom, an arbor bearing on the opposite end of the drum co-axial with said spindle, a cutter arbor in driving connection with said spindle and revoluble in said bearing, means for supporting work in juxtaposition to the arbor, means for revolving the arbor, and means for moving the drum about its axis to carry the arbor toward the work in a feed movement.

20. In a metal working machine, a drum mounted to oscillate about its longitudinal axis, a spindle revolubly mounted upon one end of the drum in parallel but spaced relation therefrom, an arbor bearing on the opposite end of the drum co-axial with said spindle, a cutter arbor in driving connection with said spindle and revoluble in said bearing, means for supporting work in juxtaposition to the arbor, a spindle driving shaft co-axial with the drum, an internal gear in driving connection wtih the spindle, a pinion on said shaft in mesh with said internal gear, means for revolving said shaft, and means for moving the drum about its axis to carry the arbor toward the work in a feed movement.

21. A milling machine of the character described comprising a bed, means for supporting the work on the bed in a rigid stationary position, a pair of laterally spaced cutter spindles between which the work is interposed, milling cutters carried by the spindles, oscillatory means for supporting each spindle on the bed with capacity to oscillate about a stationary axis, whereby to move the cutters in a feed movement for milling the work and a return movement for withdrawing the cutters therefrom, means for revolving the spindles, and mechanism for oscillating said spindle-carrying means to effect said feed and return movements.

22. A milling machine of the character described comprising a bed, means for supporting the work on the bed in a rigid stationary position, a pair of laterally spaced cutter spindles between which the work is interposed, milling cutters carried by the spindles, oscillatory means for supporting each spindle on the bed with capacity to oscillate about a stationary axis, whereby to move the cutters in a feed movement for milling the work and a return movement for withdrawing the cutters therefrom, means for revolving the spindles, and mechanism for oscillating said spindle-carrying means in a slow feed movement and a relatively fast return movement.

23. A milling machine of the character described comprising a bed, means for supporting the work on the bed in a rigid stationary position, a pair of laterally spaced cutter spindles between which the work is interposed, milling cutters carried by the spindles, oscillatory means for supporting each spindle on the bed with capacity to oscillate about a stationary axis, whereby to move the cutters in a feed movement for milling the work and a return movement for withdrawing the cutters therefrom, means for revolving the spindles, and mechanism for oscillating said spindle-carrying means including a feed clutch and a quick return clutch for transmitting said feed and return movements.

24. In a milling machine, the combination of a work support, a cutter spindle, a spindle-driving shaft eccentric to said spindle, gearing between the spindle and driving shaft, means for supporting said spindle to oscillate about the axis of said driving shaft, whereby to move the spindle in feed and return movements with respect to the work, means for driving said shaft, and means for oscillating said spindle-carrying means.

25. In a milling machine, the combination of a work support, a cutter spindle, a spindle-driving shaft eccentric to said spindle, gearing between the spindle and driving shaft, means for supporting said spindle to oscillate about the axis of said driving shaft, whereby to move the spindle in feed and return movements with respect to the work, means for driving said shaft, a segmental worm gear connected with said spindle-carrying means, and a worm meshing with said worm gear and adapted to be rotated for transmitting feed and return movements to said spindle-carrying means.

26. The combination of a work support, a drum saddle, a drum mounted to oscillate in said saddle, a shaft eccentric to the drum, a cutter spindle mounted on this drum, a driving connection between said shaft and spindle, a worm gear fixed to the drum, and a worm for meshing with said gear for oscillating the worm to feed the cutter spindle with respect to the work on said work holder.

WILLIAM C. SPROUL.